United States Patent [19]

Umeda

[11] 4,410,919
[45] Oct. 18, 1983

[54] TAPE LOADING APPARATUS IN A RECORDING AND/OR REPRODUCING APPARATUS

[75] Inventor: Hiroyuki Umeda, Yokohama, Japan

[73] Assignee: Victor Company of Japan, Ltd., Yokohama, Japan

[21] Appl. No.: 241,254

[22] Filed: Mar. 6, 1981

[30] Foreign Application Priority Data

| Mar. 7, 1980 [JP] | Japan | 55-28909 |
|---|---|---|
| Mar. 7, 1980 [JP] | Japan | 55-28910 |
| Mar. 7, 1980 [JP] | Japan | 55-28911 |
| Mar. 7, 1980 [JP] | Japan | 55-28912 |
| Mar. 7, 1980 [JP] | Japan | 55-28913 |
| Mar. 7, 1980 [JP] | Japan | 55-28914 |

[51] Int. Cl.³ ............................................. G11B 15/66
[52] U.S. Cl. ........................................ 360/85; 360/95
[58] Field of Search ............... 360/85, 95, 132, 130.21, 360/130.22, 130.23; 242/198

[56] References Cited

U.S. PATENT DOCUMENTS

| 4,060,840 | 11/1977 | Umeda . | |
|---|---|---|---|
| 4,115,825 | 9/1978 | Hayashi | 360/85 |
| 4,138,699 | 2/1979 | Ura et al. | 360/85 |
| 4,258,399 | 3/1981 | Iijima et al. | 360/85 |
| 4,323,936 | 4/1982 | Beitler et al. | 360/85 |
| 4,345,282 | 8/1982 | Miyakawa et al. | 360/85 |

FOREIGN PATENT DOCUMENTS

| 2025145 | of 0000 | Fed. Rep. of Germany . | |
|---|---|---|---|
| 2719746 | of 0000 | Fed. Rep. of Germany . | |
| 54-162519 | of 0000 | Japan . | |
| 1312334 | 4/1973 | United Kingdom | 360/95 X |
| 2014778A | of 0000 | United Kingdom . | |
| 2015230A | of 0000 | United Kingdom . | |
| 2020878A | of 0000 | United Kingdom . | |

Primary Examiner—John H. Wolff
Attorney, Agent, or Firm—Louis Bernat

[57] ABSTRACT

A tape loading apparatus is employed in a recording and/or reproducing apparatus including, a guide drum having at least one head for recording or reproducing a signal on or from a tape. The tape loading apparatus comprises endless belt-shaped members provided side by side on both sides of the guide drum so that each endless belt-shaped member has one straight portion extending between the guide drum and a cassette, driving mechanism for driving the endless belt-shaped members so that the endless belt-shaped members travel in a direction towards the guide drum upon loading mode, and travel in a direction towards the cassette upon unloading mode, a pair of tape guiding mechanisms for guiding the tape so that the tape travels along a predetermined tape travelling path throughout a predetermined range with respect to the guide drum at a predetermined position, by locking the tape and moving in accordance with the travel of each endless belt-shaped member from a position inside the cassette to the predetermined position adjacent the guide drum upon loading mode, a pair of stopping members fixed at the above predetermined position, guiding path mechanism for guiding the pair of tape guiding mechanism so that the tape guiding mechanisms move along a predetermined path, and supporting and holding mechanism for supporting and holding the tape guiding mechanism at the above predetermined position by pushing against the stopping members to urge the tape guiding mechanism in a direction identical to the moving direction upon loading mode, after the tape guiding mechanism has reached the above predetermined position by moving along the guiding path mechanism.

5 Claims, 10 Drawing Figures

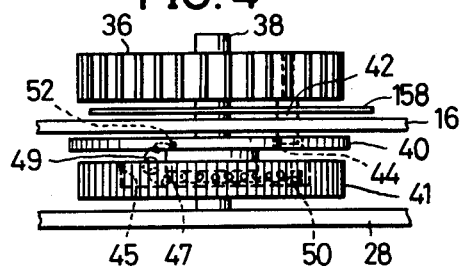
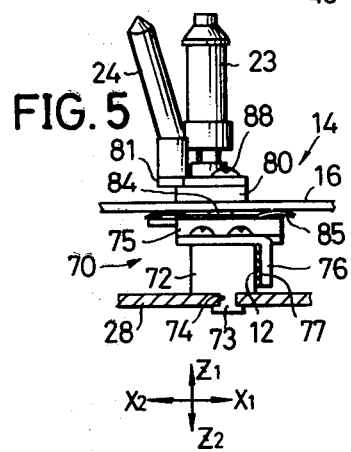
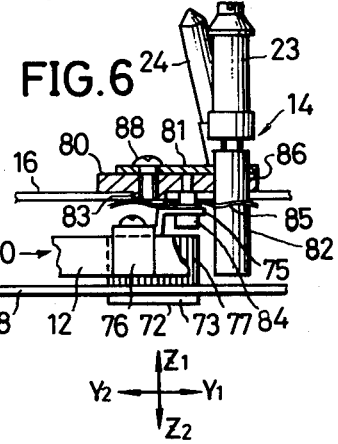
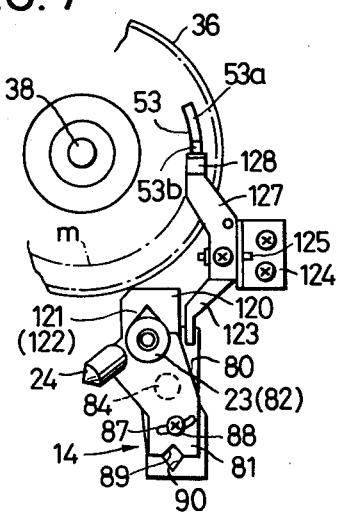

TAPE LOADING APPARATUS IN A RECORDING AND/OR REPRODUCING APPARATUS

BACKGROUND OF THE INVENTION

The present invention generally relates to tape loading apparatuses in recording and/or reproducing apparatuses, and more particularly to a tape loading apparatus which accurately and stably maintains a predetermined tape travelling path, by positively supporting and holding, at a predetermined position, a member for pulling a tape out from a cassette to load the tape onto a predetermined tape travelling path in a recording and/or reproducing apparatus.

Conventionally, as an apparatus for loading a magnetic tape accommodated within a cassette which is loaded onto a predetermined position of a magnetic recording and/or reproducing apparatus, by pulling the magnetic tape outside from the cassette and loading the magnetic tape onto a predetermined tape travelling path of the magnetic recording and/or reproducing apparatus, there was a device in which a rotary ring for surrounding a guide drum provided with rotary magnetic heads, is provided. In this apparatus, a pole embeddedly provided on the ring engages to and pulls out the magnetic tape outside from the cassette upon rotation of the ring, to load the tape onto a predetermined tape travelling path. However, in this conventional apparatus, the construction of the tape loading apparatus is complex, since the ring having a large diameter must be rotated outside of the guide drum. Furthermore, this conventional apparatus was especially disadvantageous in that it was difficult to apply the apparatus to a magnetic recording and/or reproducing apparatus for home use because of the complex construction and the large size of the apparatus.

In addition, as another conventional tape loading apparatus, there was an apparatus provided with a pair of tape pulling-out mechanisms respectively having a tape pulling-out pole. Each of the above pair of tape pulling-out mechanisms of the conventional apparatus comprises a pair of levers respectively rotatable in mutually opposite directions where the pair of levers are respectively provided with a tape pulling-out pole embeddedly fixed to the tip end thereof, a pair of locking members for locking the tape pulling-out poles provided on these levers at predetermined rotated positions, and a pair of pushing levers for supporting and holding the tape pulling-out poles at locked positions by rotating and pushing the poles from the rear against the locking members, after the poles have rotated to positions where the poles are to be locked by the locking members. Further detailed description of the construction of this conventional apparatus is given in the U.S. Pat. No. 4,138,699 of which the assignee is the same as that of the present application.

However, in this conventional apparatus, the construction of the apparatus is complex since two pairs of levers are used, and a large space is required for the rotating range. Further, it becomes necessary to position these pairs of levers provided on the poles at differing heights so that the levers do not make contact with each other, because these levers are in an intercrossing state on the plan view. Accordingly, the construction of the apparatus becomes complex, and was disadvantageous in that the adjusting operation upon assembling of the apparatus is troublesome.

SUMMARY OF THE INVENTION

Accordingly, a general object of the present invention is to provide a novel and useful tape loading apparatus in a recording and/or reproducing apparatus.

Another and more specific object of the present invention is to provide an automatic tape loading apparatus provided with a tape pulling-out member for pulling the tape out of the cassette to load it onto a predetermined tape travelling path, a locking member for locking the tape pulling-out member at a predetermined position, and means for moving the tape pulling-out member in the direction the tape is pulled out and urging the tape pulling-out member in a direction so as to make contact with and push against the locking member. According to the apparatus of the present invention, the tape can be pulled out by use of a device having a small and simple construction, and the tape travelling path can be stably maintained at a constant state by stably supporting and holding the tape pulling-out at a predetermined position.

Still another object of the present invention is to provide a tape loading apparatus in which a tape pulling-out member is moved along a guide groove provided in the chassis by the travel of an endless member such as an endless belt. Since rotatable levers are not used to move the tape pulling-out member, the construction of the apparatus is simple, and the apparatus can be manufactured in a small size.

Further objects and features of the present invention will be apparent from the following detailed description when read in conjunction with the accompanying drawings.

BRIEF DESCRIPTION OF THE DRAWINGS

FIG. 4 is a side view showing the belt driving mechanism part seen along the line IV—IV in FIG. 3;

FIGS. 5 and 6 are respectively side views of the guide pole mechanism part respectively seen along the line V—V and VI—VI in FIG. 1;

FIGS. 7 and 8 are a plan view and a side view respectively showing the relationship between the guide pole mechanism part and the guide pole position restricting mechanism part in a tape loading completed state;

DETAILED DESCRIPTION

Figure 1:
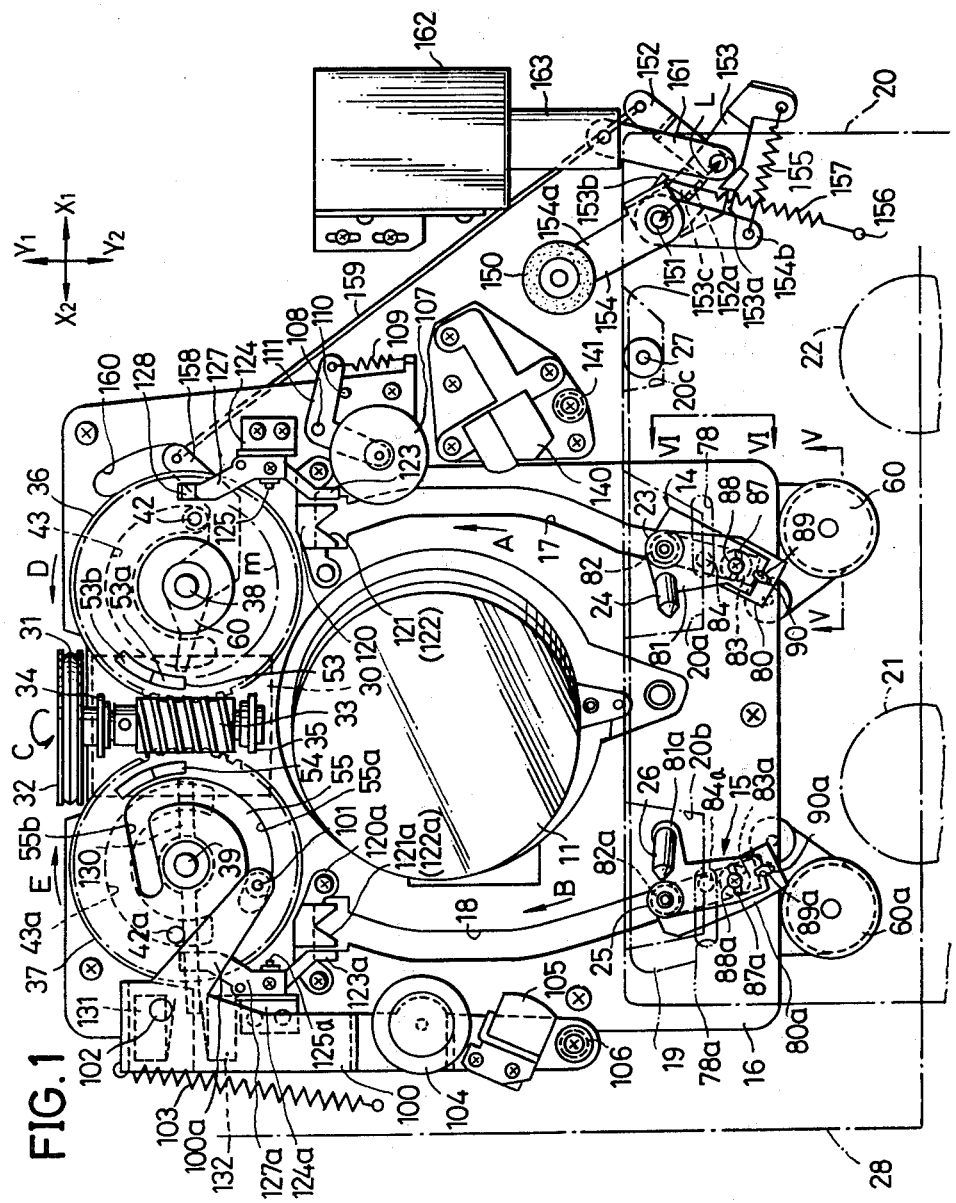
FIG. 1 is a plan view showing a first embodiment of a tape loading apparatus according to the present invention in a tape unloaded state.
Figure 2:
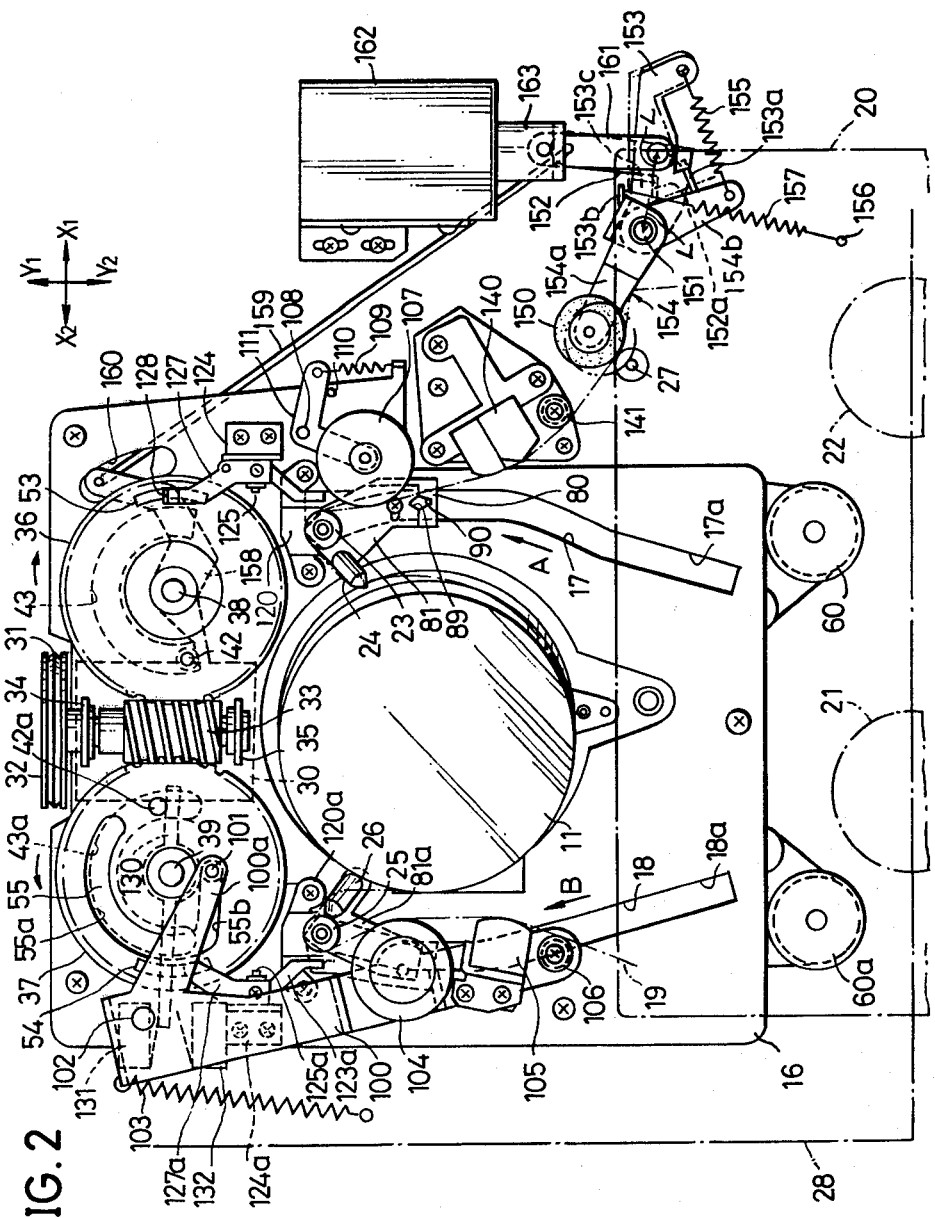
FIG. 2 is a plan view showing the apparatus in FIG. 1 in a tape loading completed state.

First, a general description will be given on the tape loading operation. In FIG. 1, when belts 12 and 13 provided with teeth, which are respectively positioned side by side and separately provided at the tape leaving side and the tape entering side with respect to a guide drum 11, are respectively driven and travel in mutually opposite directions, guide pole mechanisms 14 and 15 respectively move along guide grooves 17 and 18 which are formed on a sub-chassis 16, in the directions of arrows A and B. The guide pole mechanisms 14 and 15 lock a magnetic tape 19 and move, while drawing out the magnetic tape 19 outside a cassette 20. When the guide pole mechanisms 14 and 15 respectively reach the final positions, the tape 19 is loaded onto a tape path where the tape 19 makes contact with the peripheral surface of the guide drum 11 throughout a predetermined angle range, as shown in FIG. 2. The tape loading release operation is performed by the movements of the guide pole mechanisms 14 and 15 in directions opposite to the above described directions.

Next, a detailed description will be given on the construction and the operation of an automatic tape loading apparatus.

Only the mechanisms on the tape leaving side will be described for those mechanisms which are constructed symmetrically with respect to the left and right sides on the tape leaving side and the tape entering side, respective of the guide drum 11. The corresponding constructing parts on the tape entering side which are the same as those on the tape leaving side are designated by the like reference numerals with a subscript "a", and their description will be omitted.

In a tape unloaded state shown in FIG. 1, the cassette 20 is inserted inside a cassette holder (not shown) and loaded at a predetermined position, where two reels of the cassette 20 are respectively inserted and fitted to a supply side reel disc 21 and a take-up side reel disc 22. The magnetic tape 19 is in a position alongside the front surface of the cassette 20. A vertical guide roller 23 and a sloping guide pole 24 of the guide pole mechanism 14 are provided inside an opening 20a at the front side surface of the cassette 20. On the other hand, a vertical guide roller 25 and a sloping guide pole 26 of the guide pole mechanism 15 are provided inside an opening 20b at the front side surface of the cassette 20. Further, a capstan 27 is relatively inserted inside an opening 20c at the front side surface of the cassette 20, and the above openings 20a, 20b, and 20c are respectively positioned at the side opposing the inner side of the magnetic tape 19.

The sub-chassis 16 is provided above a main chassis 28, in a position opposing and separated from the main chassis 28. The mechanisms shown in FIG. 1 are assembled onto the sub-chassis 16, and the mechanisms shown in FIG. 3 and a pinch roller mechanism are provided onto the main chassis 28.

The guide drum 11 comprises an upper rotary drum provided with a rotary video head and a lower fixed drum, and is provided onto the sub-chassis 16.

When a reproduction (or recording) mode starting operation is performed in a state shown in FIG. 1, a tape loading motor 30 fixed to the bottom surface of the main chassis 28 starts to rotate, and a worm gear 33 is rotated in the directions of arrow C through a belt 31 which passes through an opening 28a of the main chassis 28, and a pulley 32. The worm gear 33 is supported on the sub-chassis 16 by bearings 34 and 35. A pair of worm wheels 36 and 37 respectively make contact with and mesh with the worm gear 33 at opposing positions on the left and right hand sides, and the worm wheels 36 and 37 respectively rotate in the directions of arrows D and E due to the above rotation of the worm gear 33.

Figure 3:
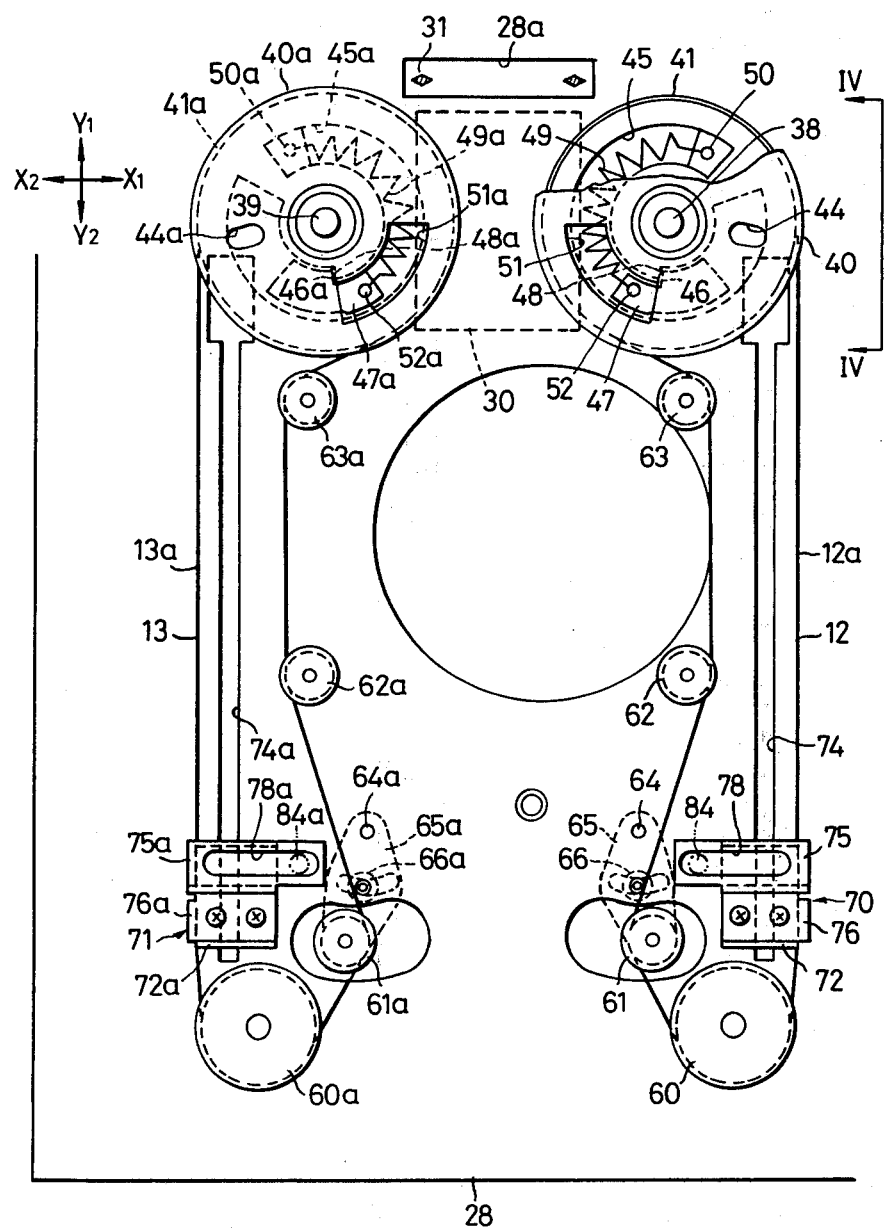
FIG. 3 is a plan view showing a mechanism on a main chassis in the apparatus in FIG. 1 with the sub-chassis removed.

The worm wheels 36 and 37 are respectively supported by shafts 38 and 39 embeddedly provided on the main chassis 28. These worm wheels 36 and 37 respectively have functions to drive the belts 12 and 13, and the mechanisms related to the worm wheel 36 are shown in FIGS. 1, 3, and 4. A disc 40 and a pulley 41 comprising teeth, are independently supported by the shaft 38 between the main chassis 28 and the sub-chassis 16. Accordingly, the worm wheel 36, the disc 40, and the pulley 41 are independently supported by the same shaft 38. A pin 42 is embeddedly provided on the upper surface of the worm wheel 36. The pin 42 is inserted within a corresponding hole 44 of the disc 40 through a semi-arcuate opening 43. Hence, the disc 40 unitarily rotates with the worm wheel 36. A C-shaped groove 45 is formed on the upper surface of the pulley 41. A portion of the C-shaped groove 45 is wide, and a step portion 46 extending in the radial direction is formed at the above wide portion of the C-shaped groove 45. Furthermore, an arcuate plate member 47 is fixed to the lower surface of the disc 40. A step portion 48 in the radial direction is provided on the arcuate plate member 47.

The disc 40 and the pulley 41 are arranged adjacent each other, by inserting the arcuate plate member 47 into the C-shaped groove 45 and positioning a coil spring 49 inside the C-shaped groove 45, and the disc 40 having a large diameter acts as a guiding rim with respect to the belt 12. The above coil spring 49 has one end hooked and fixed to a pin 50 at the end part of the groove 45, and the other end is hooked and fixed to a pin 52 embeddedly fixed on the arcuate plate member 47 through an opening 51 of the disc 40, and the coil spring 49 is installed in a state where the tension is built up and stored. By the action of this coil spring 49, the disc 40 and the pulley 41 are respectively urged rotationally in the clockwise and counter-clockwise directions in FIG. 3, and the disc 40 and the pulley 41 substantially rotate unitarily being relatively restricted of the rotation in a state where the step portions 46 and 48 respectively push against each other.

Figure 9:
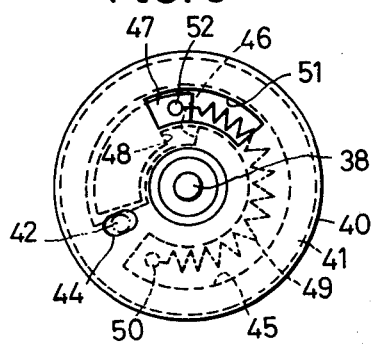
FIG. 9 is a plan view showing the belt drive mechanism part in a tape loading completed state.

The stored tension of the coil spring 49 is selected at a tension to allow the positive following movement of the pulley 41 with respect to the counter-clockwise rotation of the disc 40, against the load of the tape loading operation. Since the disc 40 and the pulley 41 are connected as described above by the action of the coil spring 49, the pulley 41 can be put to a state where the pulley 41 is urged by a rotational force in the counter-clockwise direction at the final rotated position of the disc 40 as shown in FIG. 9 and described hereinafter. Accordingly, the guide wheel mechanism 14 is positively supported and held at a predetermined position.

The mechanisms related to the other worm wheel 37 are also constructed similarly, and their description will be omitted.

Moreover, projecting cams 53 and 54 are formed on the upper surface of the worm wheels 36 and 37, for operating the pushing mechanism which will be described later. Further, a C-shaped cam groove 55 is formed on the upper surface of one worm wheel 37.

The endless belt 12 is wound around the pulley 41, and guide pulleys 60, 61, 62, and 63, to form a closed loop. One guide pulley 61 is provided on a rotatable arm 65 which is axially supported by a pin 64. The rotatable arm 65 is fixed by a screw 66 in a state where the rotatable arm 65 is rotated after the belt 12 is wound around the guide pulleys 60, 61, 62, and 63 as described above, and pushes the guide pulley 61 against the belt 12 to apply a predetermined tension on the belt 12. The belt 13 positively travels without slipping, responding to the rotation of the pulley 41. Moreover, the belt 13 is wound around the periphery of the pulley 41 over a range of 270 degrees due to the action of the guide pulley 63, and the slippage between the belt 13 and the pulley 41 is positively prevented. In addition, a straight portion 12a of the belt 12 between the pulley 41 and the guide pulley 60 extend along the directions of arrows Y1 and Y2.

The endless belt 13 at the tape entering side is wound around and positioned similarly to the belt 12.

Connecting mechanisms 70 and 71 for connecting the guide pole mechanisms 14 and 15 to the belts 12 and 13, are respectively provided on the belts 12 and 13. In the connecting mechanism 70, a block 72 is placed on the main chassis 28 as shown in FIGS. 5 and 6, where a projection 73 having a T-shaped cross-section is inserted and fitted into a guide groove 74 of the main chassis 28 in a freely detachable manner. The guide groove 74 extends parallel to the portion 12a of the belt 12. A connecting member 75 is mounted onto the block 72 by two screws, in a state where the belt 12 is pushed against a side surface 77 having teeth of the block 72, and clamped by a curved member 76. Accordingly, the connecting mechanism 70 is fixed by the belt 12, and moves in the directions of the arrows Y1 and Y2 according to the travel of the belt 12 while being guided by the guide groove 74.

Furthermore, the position of the connecting mechanism 70 is determined so that the connecting mechanism 70 is in a returned position shown in FIG. 3 when the worm wheel 36 is in a rotated position shown in FIG. 1, and the connecting mechanism 70 is thus fixed to the belt 12. The relative positional relationship between the rotated angular position of the worm wheel 36 and the position of the connecting mechanism 70 in the directions of the arrows Y1 an Y2 are always positively maintained to a predetermined relationship, since no slippage exists between the belt 12 and the pulley 41 and the belt 12 does not expand.

A longitudinal opening 78 extending in directions (directions of arrows X1 and X2) perpendicular to the moving directions of the connecting mechanism 70, is formed in the connecting member 75. A connecting pin 84 of the guide pole mechanism 14 is inserted within the above longitudinal opening 78.

The other connecting mechanism 71 is constructed similarly to the above described connecting mechanism 70.

The guide pole mechanism 14 comprises a mounting support 80 provided with the vertical guide roller 23, and a mounting plate 81 positioned above the mounting support 80 and having the sloping guide pole 24 embeddedly fixed thereto.

The mounting support 80 is positioned on the sub-chassis 16 in a state where a vertical pole 82 and a projection 83 (the vertical pole 82 and the projection 83 are provided at positions separated from each other along the directions of the arrows Y1 and Y2) which pass through the mounting support 80 and are embeddedly fixed thereto, are inserted to and fitted into the guide groove 17. In addition, the connecting pin 84 is embeddedly fixed on the upper surface of the mounting support 80, at an intermediate position between the vertical pole 82 and the projection 83. This connecting pin 84 passes through the above guide groove 17, and is inserted within the longitudinal opening 78. Moreover, a leaf spring 85 is fixed so as to oppose the lower surface of the sub-chassis 16 relative to the connecting pin 84. The mounting support 80 is in a state where the mounting support 80 is elastically pulled above the sub-chassis 16 by the action of the leaf spring 85, and thus, the mounting support 80 smoothly moves along the guide groove 17 above the sub-chassis 16 as will be described later on. The vertical guide roller 23 is provided on the vertical pole 82.

The mounting plate 81 is rotatably constructed to rotate having a hole 86 as the center where the hole 86 is inserted with the above vertical pole 82, and is fixed by a longitudinal opening 87 and a screw 88 at a predetermined rotated position, that is, at a position where the sloping guide pole 24 faces a predetermined angular direction with respect to the guide drum 11 in a state shown in FIG. 2. This adjusting operation to adjust the rotated position is simply performed by inserting the tip end of a negative screw-driver into the space formed between a V-shaped cutout 89 of the mounting plate 81 and a depression 90 of the mounting support 80, and twisting the screw-driver.

Since the connecting pin 84 is inserted into the longitudinal opening 78 as described above, the guide pole mechanism 14 is connected to the connecting mechanism 70 and moves in the directions of the arrows Y1 and Y2 following the movement of the connecting mechanism 70. Moreover, the guide pole mechanism 14 moves independently in the directions of the arrows X1 and X2 with respect to the connecting mechanism 70.

The other guide pole mechanism 15 is constructed in the similar manner as the above described guide pole mechanism 14.

When the worm wheels 36 and 37 rotate as described above, the pulleys 41 and 41a respectively rotate unitarily with these worm wheels 36 and 37 in the directions of the arrows D and E. Hence, the belts 12 and 13 respectively travel without introducing slippage, and the connecting mechanisms 70 and 71 respectively move along the guide grooves 74 and 74a in the direction of the arrow Y1 and shown in FIG. 3. Due to the movement of the connecting mechanisms 70 and 71, the guide pole mechanisms 14 and 15 move so as to follow the connecting mechanisms 70 and 71. The vertical pole 82 (82a) and the projection 83 (83a) respectively positioned at the front side and at the rear side in the moving directions of the guide poles 14 and 15, are guided by the guide groove 17 (18), and thus, the guide poles 14 and 15 respectively move in the directions of the arrows A and B. The guide grooves 17 and 18 are formed so as to lead the guide pole mechanisms 14 and 15 through both outer sides of the guide drum 11, into positions shown in FIG. 2. These guide grooves 17 and 18 extend in directions different from the moving directions of the connecting mechanisms 70 and 71. However, since the connecting pin 84 freely moves along the longitudinal opening 78 in the directions of the arrows X1 and X2, the guide pole mechanisms 14 and 15 respectively move on paths different from those of the connecting mechanisms 70 and 71, that is, along the guide grooves 17 and 18.

The guide rollers 23 and 25 and the guide poles 24 and 26 engage to the magnetic tape 19 when the guide pole mechanisms 14 and 15 respectively slip out of the openings 20, and pulls the magnetic tape 19 outside the cassette 20.

The moving directions of the guide pole mechanisms 14 and 15 are determined by the guide grooves 17 and 18. Sides 17a and 18a of the guide grooves 17 and 18 in the direction of the arrow Y2 are respectively formed so as to direct the sloping guide poles 24 and 26 of the guide pole mechanisms 14 and 15 to face the directions of the arrows X1 and X2, and to align the sloping guide poles with the vertical guide rollers 23 and 25 in the directions of the arrows X1 and X2, respectively. Further, the openings 20a and 20b of the cassette 20 are shaped wide in the direction of the arrow X and narrow in the direction of the arrow Y, due to the tape winding bodies formed inside the cassette 20. In a tape unloaded state, the sloping guide poles 24 and 26 and the vertical guide rollers 23 and 25 are aligned in a sloping state in the direction of the arrow X (in a direction parallel to the front surface of the cassette 20), as shown in FIG. 1. Hence, upon loading of the cassette 20, the guide pole 24 and the guide roller 23 smoothly enter within the narrow opening 20a while the guide pole 26 and the guide roller 25 smoothly enter within the narrow opening 20b, without hitting the wall surface and the like of the cassette 20. Accordingly, accidents in which the magnetic tape 19 enter on the inner side of the guide poles 24 and 26 are prevented.

The guide pole mechanisms 14 and 15 engage to the magnetic tape 19 and pull the magnetic tape 19 outside from the cassette 20, while moving to positions shown in FIG. 2 along the guide grooves 17 and 18. In a tape unloaded state or upon a tape loading operation, a pin 101 on a branching arm 100a of a support arm 100 is guided by the C-shaped cam groove 55 of the worm wheel 37, and the support arm 100 rotates in the clockwise direction against a spring 103 relative to a shaft 102 of the sub-chassis as shown in FIG. 1. In addition, an impedance roller 104, a full width erasing head 105, and a guide pole 106 are receded from the moving path of the guide roller 25 and the guide pole 26 of the guide pole mechanism 15 in this state. An impedance roller 107 on the tape leaving side is supported at the tip end of an L-shaped lever 111 which is axially supported by a pin 108 and urged with a rotational force in the clockwise direction by a spring 109 and also limited of the rotation in the same clockwise direction by a stop pin 200. Thus, the guide pole mechanism 14 moves while the vertical guide roller 23 pushes the impedance roller 107 away in the direction of the arrow X1. At this point, the L-shaped lever 111 is rotated in the counter-clockwise direction against the spring 109.

Figure 8:
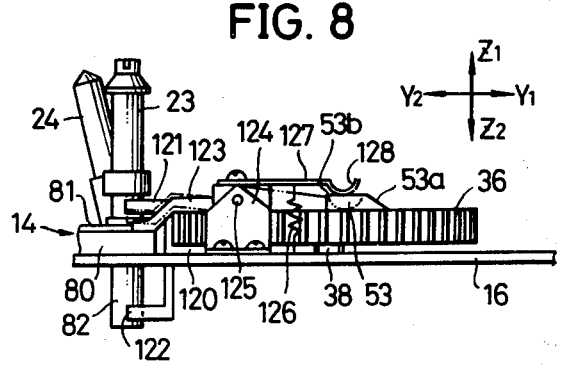

The guide pole mechanisms 14 and 15 are locked as shown in FIGS. 7 and 8 in the final positions shown in FIG. 2.

The movement of the guide pole 14 in the direction of the arrow A along the guide groove 17 is restricted because the upper and lower parts of the vertical pole 82 respectively make contact with upper side V-shaped groove 121 and lower side V-shaped groove 122 of a stopper 120. The stopper 120 is fixed on the sub-chassis 16. The mounting support 80 of the guide pole mechanism 14 enters below a pushing lever 123 as shown by the two-dot chain line in FIG. 8. The pushing lever 123 is axially supported by a pin 125 on a support bracket which is fixed on the sub-chassis. Moreover, a leaf spring 127 is fixed to the pushing lever 123, and generally, an U-shaped curved portion 128 at the tip end of the leaf spring 127 makes contact with the upper surface (at a position within the rotational path m of the projecting cam 53) of the worm wheel 36 due to the action of a spring 126, and the pushing lever 123 rotates in the clockwise direction in FIG. 8 and moves upwards.

The motor 30 still continues to rotate even after the movement of the guide pole mechanism 14 in the direction of the arrow A is restricted, and the rotation of the pulley 41 in the direction of the arrow D is restricted. The pin 42a of the worm wheel 37 pushes one arm portion of a switch lever 130 which is axially supported by the shaft 39 as shown in FIG. 2 due to the above rotation of the motor 30, and accordingly, the rotation of the motor 30 is stopped when one micro-switch 131 is turned OFF. The worm wheel 36 and the disc 40 rotate independently from the pulley 41 while being accompanied by the deformation of the spring 49 under tension, due to the above rotation of the motor 30. When the motor 30 is stopped, the disc 40 (worm wheel 36) and the pulley 41 approximately undergo a half-rotation and is put in a state shown in FIG. 9, that is, in a state where the rotation of the disc 40 (worm wheel 36) is restricted by the worm gear 33, the step portion 46 and the step portion 48 separate, and the pulley 41 is urged in the direction of the arrow D by a rotational force due to the tension of the deformed coil spring 49. The above rotational force of the pulley 41 acts as a displacing force in the direction of the arrow Y1 to the connecting mechanism 70 through the belt 12, and the guide pole mechanism 14 is accordingly urged in the same direction (direction of the arrow Y1). Therefore, the vertical pole 82 is pushed within the upper and lower V-shaped grooves 121 and 122. Hence, since the vertical guide pole 82 pushes against the V-shaped grooves 121 and 122 at two positions, that is, at the upper and lower positions, the positions along the directions of the arrows X and Y and the vertical state of the vertical guide roller 23 is accurately determined, and the sloping direction of the sloping guide pole 24 is determined due to the insertion and fine fitting of the projecting portion 83 into the guide groove 17, restricting the position of the guide pole mechanism 14.

Moreover, the position where the connecting mechanism 70 exerts the above displacing force on the guide pole mechanism 14 is at an intermediate position between the upper and lower V-shaped grooves 121 and 122 as shown in FIG. 6, and thus, the guide pole mechanism 14 is stably pushed without unnecessarily sloping due to the above displacing force.

Furthermore, the pushing operation described below is performed simultaneously with the above pushing operation of the vertical pole 82 against the stopper 120. At the final rotational position where the worm wheel 36 unitarily rotates with the pulley 41, the projecting cam 53 is positioned immediately in front of the U-shaped curved portion 128 of the leaf spring 127. When the worm wheel 36 rotates independently from the pulley 41, a sloping surface 53a of the projecting cam 53 gradually pushes the leaf spring 127 up, and the mounting support 80 of the guide pole mechanism 14 is pushed in the direction of arrow Z2 due to the rotation of the pushing lever 123 against the spring 126 in the counter-clockwise direction in FIG. 8. In a state where the worm wheel 36 has stopped rotating, the U-shaped curved portion 128 of the leaf spring 127 opposes a flat surface 53b at the tip portion of the projecting cam 53. Accordingly, due to the elasticity of the leaf spring 127, the pushing lever 123 pushes the guide pole mechanism 14 against the sub-chassis 16 to clamp the guide pole mechanism therebetween, and the positions of the vertical guide roller 23 and the sloping guide pole 24 are restricted in the direction of the arrow Z.

Since the force for restricting the position of the vertical guide roller 23 in the directions of the arrows X and Y and the force for restricting the position of the vertical guide roller 23 in the direction of the arrow Z gradually increase simultaneously, one position restricting operation is not restricted by the position restricting operation of the other. Therefore, the position of the vertical guide roller 23 is accurately restricted in the directions of the arrows X and Y at the loading position.

The moving operation of the guide pole mechanism 15 on the tape entering side into the tape loading position, and the position restricting operation to restrict the guide pole mechanism 15 at the tape loading position, are performed in the similar manner to the above.

In addition, regarding the guide pole mechanisms 14 and 15, when a rotating lever is used as in the conventional device, the moving path and the facing direction of the guide pole mechanisms 14 and 15 at the unloaded and loading positions and the like, are determined by the center position of rotation of the rotatable lever. However, in the present embodiment of the invention, the unloaded position and the loading position of the guide pole mechanisms 14 and 15 shown in FIGS. 1 and 2 and the moving path therebetween, are respectively and separately set to a most suitable state by suitably setting the positions, extending directions, and the like of the guide grooves 17 and 18.

When the worm wheel 37 rotates in the direction of the arrow E, the pin 101 is guided by the C-shaped cam groove 55. The pin 101 is guided by an arcuate portion 55a of the cam groove 55, and the support arm 100 is held at the rotated position shown in FIG. 1, until the vertical guide roller 25 of the guide pole mechanism 15 on the tape entering side passes in front of the impedance roller 104. Then, the pin 101 is guided by a straight portion 55b of the cam groove 55, and the support arm 100 rotates in the counter-clockwise direction into the position shown in FIG. 2. Accordingly, the impedance roller 104 and the like make contact with the tape 19 pulled out from the cassette 20.

Hence, the tape loading device is put into a state shown in FIG. 2 (description of the pinch roller mechanism will be given later on), and the magnetic tape 19 is pulled out from the cassette 20 and loaded onto a predetermined tape path which includes the tape path where the tape 19 makes contact with the periphery of the guide drum 11 throughout a predetermined angle range between the pair of guide pole mechanisms 14 and 15. At the tape entering side, the magnetic tape 19 makes contact with the guide pole 106, full width erasing head 105, and the impedance roller 107, and at the tape leaving side, the magnetic tape 19 makes contact with the impedance roller 107, and audio control head 140, a guide pole 141, and a nearby pinch roller 150.

Figure 10:
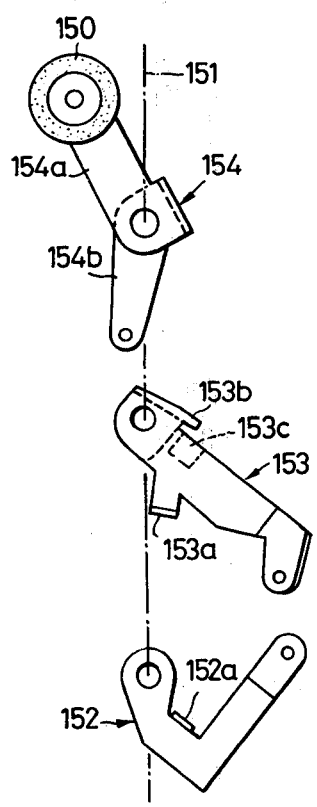
FIG. 10 is a exploded diagram of the pinch roller mechanism part.

Next, the pinch roller mechanism will be described in conjunction with FIGS. 1, 2, and 10.

The pinch roller mechanism is constructed so that the pinch roller 150 is moved from a position separated from the cassette 20 to a position adjacent to the capstan 27 in advance, relative to the above tape loading operation, and by the succeeding operation by the solenoid, the pinch roller 150 moves a slight distance to push against and engage to the capstan 27.

An L-shaped lever 152, a lever 153 for applying a pushing force, and a pinch roller supporting lever 154 respectively are independently supported in a stacked state on a shaft 151 which is embeddedly fixed on the main chassis 28.

The pinch roller 150 is provided at the tip end of one arm portion 154a of the pinch roller supporting lever 154. A spring 155 having a large spring constant is provided between another arm portion 154b of the lever 154 and the tip end of the lever 153. Accordingly, the levers 154 and 153 are in an unitarily rotatable state where the above arm portion 154b and a rising curved portion 153a are in a fixed state. Upon tape unloaded state, the levers 154 and 153 are unitarily rotating in the clockwise direction due to the action of a spring 157 provided between a lug portion 153b of the lever 153 and a pin 156, and the pinch roller 150 is considerably separated from the capstan 27. Thus, the cassette loading operation and the lid opening operation to open the front lid of the cassette upon this state, are performed smoothly without hitting the pinch roller 150. The lever 152 is connected to a rotatable lever 158 which is axially supported by the above described shaft 38, by a rod 159. Since the rotational position of the rotatable lever 158 in the clockwise direction is restricted by a longitudinal opening 160 provided in the sub-chassis 16, the rotational position of the lever 152 in the clockwise direction is also restricted. In a tape unloaded state, the lever 152 also operates to determine the rotational position of the levers 153 and 154 in the clockwise direction, because a rising curved portion 152a of the lever 152 receives the curved portion 153b of the lever 153. Further, the lever 153 is connected to a plunger 163 of an iron core of a solenoid 162 by a link 161. The solenoid 162 is held at a position where the plunger 163 is relatively pulled outwards. The link 161 is connected to the lever 153 at a position where the length of the arm is L.

At the final stage of the above tape loading operation, the pin 42 of the worm wheel 36 pushes one end portion of the rotatable lever 158, to rotate the rotatable lever in the counter-clockwise direction. In accordance with the above movement, the lever 152 rotates in the counter-clockwise direction, and furthermore, a curved portion 153c is pushed by a curved portion 157a and the levers 153 and 154 are rotated in the counter-clockwise direction against the spring 157. Therefore, as shown in FIG. 2, the pinch roller 150 reaches a position adjacent to the capstan 27, and the plunger 163 is inserted within the solenoid 162. At this point, the relative positional relationship between the plunger 163 and the solenoid 162 is in a state where the plunger 163 can be drawn inside the solenoid 162 by a large force due to the operation of the solenoid 162.

After the pinch roller 150 is put to a state shown by the solid line in FIG. 2 in relation to the operation of the tape loading mechanism, a current is passed through the solenoid 162, and plunger 163 is drawn into the stroke end part in the direction of the arrow Y2. Accordingly, the levers 153 and 154 rotate in the counter-clockwise direction, as shown by the two-dot chain line in FIG. 2, and the pinch roller 150 pushes against the capstan 27. Thus, the lever 153 further rotates in the counter-clockwise direction, and the rising curved portion 153a separates from the other arm portion 154b. The lever 153 rotates independently from the lever 154 against the spring 155, however, since the length L of the arm is relatively long, and the solenoid 162 operates in a range where the solenoid operates powerfully (the capacity of the solenoid 162 can accordingly be small), the above independent rotating operation of the lever 154 can be performed positively. The pinch roller 150 is pushed against the capstan 27 through the magnetic tape 19 due to the rotational force in the counterclockwise direction applied by the spring 155 relative to the lever 154.

When the pinch roller 150 pushes against the capstan 27 due to the operation of the solenoid 162, the moving distance of the pinch roller 150 is very small. Moreover, the pushing operation of the pinch roller 150 against the capstan 27 is performed under little shock, without introducing scratches in the magnetic tape 19.

By the pushing operation of the pinch roller 150 against the capstan 27, the magnetic tape 19 travles along a predetermined tape path where the magnetic tape 19 is loaded, and the recording or reproduction can accordingly be performed.

Furthermore, by putting the solenoid 162 into a non-operational state upon recording mode, the pinch roller 150 slightly separate from the capstan 27 as shown by the solid line in FIG. 2. When the solenoid 162 is operated again, the pinch roller 150 moves a small distance from the above position to press against the capstan 27. Accordingly, a so-called continuous operation is smoothly performed in which the recording or reproduction is performed from a position on the tape immediately adjacent to where the previous recording or reproduction was discontinued.

When a stopping operation is performed upon a recording or reproduction mode, the solenoid 162 is put into a non-operational state. Accordingly, the tape loading motor 30 starts to rotate to reverse the state, from the above described tape loading state. Thus, the worm wheels 36 and 37 rotate in opposite directions from the directions of the arrows D and E, and the mechanisms which operated upon tape loading operation operate in opposite directions in the reverse sequence from those upon tape loading operation, to perform a release operation to release the tape loading operation. The motor 30 stops rotating when the switch lever 130 is pushed and rotated by the pin 42a to turn a micro-switch OFF. Therefore, the device is put into a releasing operation completed state where the releasing operation to release the tape loading operation has been completed (tape unloaded state). Hence, during the above described releasing operation, the tape outside the cassette is drawn inside to be accommodated within the cassette by the supply reel or the take-up reel.

In addition, in the above described embodiment of the invention, instead of using the belts 12 and 13 and the pulleys 41 and 41a, other mechanisms such as chains and sprockets or films having holes and sprockets which do not introduce slippage can be used.

Moreover, guide rails and the like can be constructed to perform the function of the guide grooves 17 and 18.

Further, endless wires and the like can be used instead of the endless belt which was used as an endless member in the above embodiment of the invention.

Further, this invention is not limited to these embodiments but various variations and modifications may be made without departing from the scope of the invention.

What is claimed is:

1. A tape loading apparatus in a recording and/or reproducing apparatus including a guide drum having at least one head for recording or reproducing a signal on or from a tape, said tape loading apparatus comprising:

endless belt-shaped members provided side by side on both sides of said guide drum so that each endless belt-shaped member has one straight portion extending between said guide drum and a cassette;

driving means for driving said endless belt-shaped members so that said endless belt-shaped members travel in a direction towards said guide drum during a loading mode, and travel in a direction towards said cassette during an unloading mode;

a pair of tape guiding means for guiding said tape so that said tape travels along a predetermined path throughout a predetermined range with respect to said guide drum at a predetermined position, by locking said tape and moving in accordance with the travel of each endless belt-shaped member from a position inside said cassette to said predetermined position adjacent said guide drum upon loading mode;

a pair of stopping members fixed at the predetermined position;

guiding path means for guiding said pair of tape guiding means so that said tape guiding means move along a predetermined path;

supporting and holding means for supporting and holding said tape guiding means at the predetermined position by pushing against said stopping members to urge said tape guiding means in a direction identical to the moving direction upon loading mode, after said tape guiding means has reached the predetermined position by moving along said guiding path means; and height position restricting means comprising arm members rotatable by said driving means, for restricting a height position of said tape guiding means by pushing said tape guiding means against said tape path means by said arm members when said tape guiding means are pushed against said stopping members.

2. A tape loading apparatus as claimed in claim 1 in which said driving means for driving said endless belt-shaped members comprises a rotation driving source, a first rotary member rotated and driven by said rotation driving source, and a second rotary member wound with said endless belt-shaped member at the periphery thereof and provided on the same axis as said first rotary member, said second rotary member substantially rotating unitarily with said first rotary member; and said supporting and holding means comprises rotating means for rotating said first rotary member exceeding over a position where said second rotary member has stopped by a predetermined angle, and a spring member provided between said first and second rotary members, for urging said second rotary member in the rotating direction upon loading mode by deforming upon over-rotation of said first rotary member.

3. A tape loading apparatus as claimed in claim 2 in which said second rotary member rotates a predetermined range, said height position restricting means further comprises a cam of the second rotary member and said arm members are pushed by said cam and push against said tape guiding means.

4. A tape loading apparatus as claimed in claim 1 in which said endless belt-shaped members are endless belts having teeth.

5. A tape loading apparatus as claimed in claim 1 which further comprises means for moving a pinch roller to a position adjacent a capstan from a position separated from said capstan relative to the operation of said driving means upon loading, and a solenoid for pushing said pinch roller against said capstan by operating after said pinch roller moves adjacent to said capstan.

* * * * *